Dec. 27, 1938.   K. H. ROWLAND ET AL   2,142,036
HYDRATION OF OLEFINES
Filed Nov. 25, 1936
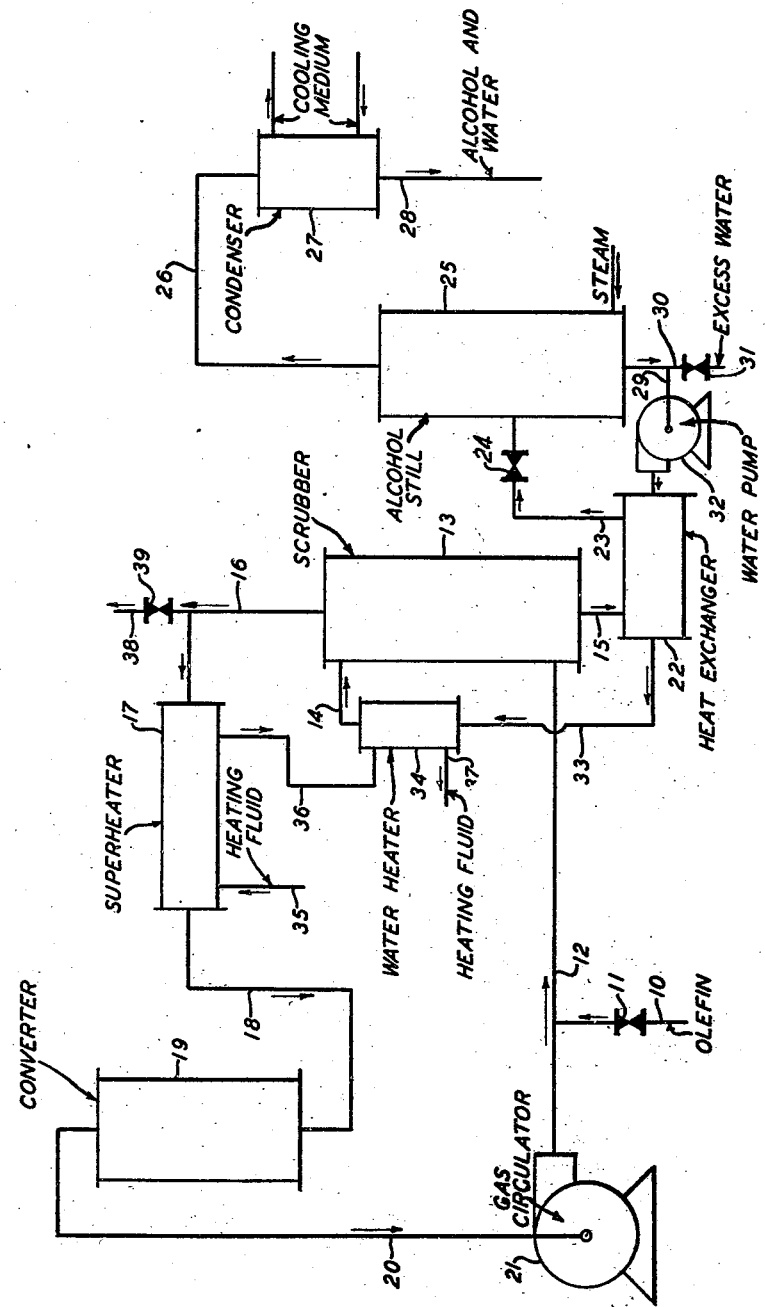
INVENTORS
KENNETH H. ROWLAND
ROLF V. WALLIN
BY
ATTORNEY Patented Dec. 27, 1938

2,142,036

UNITED STATES PATENT OFFICE 2,142,036

HYDRATION OF OLEFINES

Kenneth H. Rowland and Rolf V. Wallin, Charleston, W. Va., assignors to Carbide and Carbon Chemicals Corporation, a corporation of New York Application November 25, 1936, Serial No. 112,701

14 Claims. (Cl. 260—641)

This invention is an improved process for the production of alcohols from alkylene hydrocarbons, or olefines. The process broadly comprises a simple and novel method for securing heat economy and close control of operation in the production of alcohols by the hydration of olefines under high pressure and at high temperature.

It is well known that alcohols may be produced by passing olefines in admixture with suitable proportions of steam into intimate contact with an acid catalyst at a high temperature and under high pressure. This process is particularly advantageous for the production of ethyl alcohol and isopropyl alcohol from ethylene and propylene, respectively. It is also known that the process may be carried out advantageously in a continuous cycle by maintaining a circulating stream of the olefine under high pressure, mixing steam therewith in suitable proportions, passing the mixture into contact with the catalyst at high temperature, cooling the gases in order to condense the alcohol and excess steam while maintaining the high pressure, and recycling the olefine with further suitable additions of olefine and steam.

However, all known processes teach that regardless of the manner in which the reaction is conducted, or the means chosen to recover the contained heat of the materials leaving the reaction zone, the only way in which the products of reaction themselves may be recovered is to cool the said materials to a relatively low temperature at which condensation of a substantial part of the products of reaction takes place. Since direct hydration reactions such as these, must of their very nature be carried out at high temperatures, and, particularly under high pressures, the recovery of the reaction products by the methods heretofore proposed requires much expensive equipment in the form of specially designed heat exchangers and condensers; all of which limit the possible efficiency of heat recovery and constitute great hazard because of the high pressures at which they must be operated.

It is an object of this invention to reduce these hazards and difficulties of operation, and to obtain at the same time a higher degree of thermal efficiency than has been achieved heretofore.

Other objects of this invention will be apparent from the following description.

In this invention the reaction may be carried out at pressures from atmospheric pressure to 3,000 pounds per square inch, or more, and at temperatures ordinarily between 175° and 375° C. Sulfuric or phosphoric acids are suitable catalysts for this reaction, although other acids and acid-reacting substances may be used, and the catalyst may be a liquid, a fluid solution, or in solid form. The amount of steam present with the olefine may be varied between limits of almost no steam up to the saturation point of the gases at the reaction temperature, although a molal ratio of olefine to steam within the range of 0.4 to 4.0 is generally preferable. Space velocities from 100 to 2,000 volumes of olefine (calculated at standard conditions of temperature and pressure) per volume of catalyst per hour, may suitably be employed. Furthermore the olefine need not be pure, but may be mixed with saturated hydrocarbons, such as ethane or propane, or other gases which are inert in the reaction.

This invention is concerned largely with the maintenance of the continuous cycle (which comprises the addition of fresh materials to make up for those consumed in the reaction, passage of the gases in contact with a catalyst, removal of the products of reaction, and recirculation of the unreacted gases) at a substantially uniform temperature level, and the simultaneous removal from the unreacted gases of the alcohol formed and replacement of water vapor consumed in the reaction. This is accomplished by scrubbing the outgoing gases under substantially the high pressure and temperature of the reaction zone with water preheated to a temperature such that the washed gases will be saturated with water vapor in the desired ratio of olefine to steam. The scrubbing operation may be carried out successfully even above the critical temperature of the alcohol. The unevaporated, or excess, water will contain the alcohol removed from the gases. In this manner the unreacted gases from the converter are purified of the products of reaction without appreciable cooling and without condensation of the contained water vapor. At the same time a portion of the water fed to the scrubber is vaporized and carried along with the purified gases into the converter. By regulating the temperature of the water fed to the scrubbing system, any ratio of olefine gas to water vapor in the humidified gas may conveniently be obtained. The water and alcohol mixture from the scrubber is distilled in order to remove the alcohol from the larger part of the water. This distillation may be done continuously at substantially the temperature of the scrubbing system. In this case, the alcohol-free water can be returned to the scrubbing system at substantially the same temperature, thus augmenting the efficiency and economy of the process by eliminating the necessity for appreciable additional heating of the water. Also, the alcohol and water mixture may be cooled by heat exchange to its boiling point at atmospheric pressure and distilled at atmospheric conditions. In this case the water supplied to the scrubber would require external heating to substantially the desired temperature, which may be accomplished at least in part by heat exchange with the hot aqueous alcohol from the scrubber.

Since the reaction between the olefine and steam is exothermic, the heat of reaction will, to some extent, provide for the unavoidable thermal losses always present in a high temperature process. Although it is true that if these losses are made small enough the heat of reaction will completely compensate them, it is seldom practicable to attain such a condition. Therefore it is usually necessary to add heat to the cycle by means of an independently heated unit. This heat may be appropriately added in the form of superheat to the gases after they leave the scrubbing system, and just prior to their entry into the reaction zone if the temperature chosen for the reaction is somewhat above the temperature of the saturated gases leaving the scrubbing system. This will generally be so, for although it is quite possible to operate the cycle with the gases leaving the scrubbing system saturated with water vapor at substantially the reaction temperature, the ratio of olefine to steam will usually then be slightly below the optimum point when operating under the preferred conditions. Another very appropriate method for adding the makeup heat lies in passing the converter effluent gases in heat exchange with the scrubber effluent gases to provide for whatever superheat is necessary, and supplying the additional heat through the medium of the scrubber water. However, the net amount of heat which must be added to the cycle, and the consequent economy of the process, depends largely upon the small, but unpreventable losses due to radiation from and convection around the various pieces of apparatus operating at high temperature.

These methods of supplying the makeup heat are purely illustrative, and many other ways and variations will be apparent to those skilled in the art.

The accompanying drawing diagrammatically illustrates the flow of materials in a system embodying the invention. In the typical system shown, the olefine-containing gas enters the system through a line 10 controlled by a valve 11, is admixed with converted effluent gas in a line 12 and passes to a scrubber 13. In the scrubber 13 the alcohol-bearing gases are brought into intimate contact with preheated water from a line 14, all under substantially the pressure of the reaction zone. The water in the scrubber 13 absorbs the alcohol and by-products from the olefine-containing gases, and the aqueous alcohol is removed through a line 15. The gases, now free of alcohol and saturated with water vapor at a temperature substantially that of the preheated water (which is predetermined to give the desired ratio of steam to olefine), pass through a line 16 to a superheater 17 where the temperature of the gases is raised to that of the reaction zone. From the superheater 17 the gases pass through a line 18 to a converter 19 where part of the olefine and steam combine to form alcohol, and some by-products such as ether. However, the temperature of the converter 19 is held at such a point that all products of reaction leave the converter in the vapor phase. The products of reaction, in admixture with unreacted olefine and steam, and any inert gas present, pass through a line 20 to a gas circulator 21 and thence back through the line 12, are fortified with additional olefine to make up for that consumed in the reaction, and the cycle is repeated.

The hot aqueous alcohol under pressure in the line 15 passes into a heat exchanger 22 where it is cooled by heat exchange with the water for the scrubber 13, and passes through a line 23 controlled by a valve 24 into a still 25. In the still 25, a large part of the water is removed, and the concentrated alcohol vapors pass through a line 26 to a condenser 27 and are collected as liquid through a line 28.

If the still 25 is heated by live steam, as shown, the water removed from the alcohol will pass out of the still 25 through a line 29 in admixture with condensed steam. Excess condensate may be removed from the system through a line 30 controlled by a valve 31. The rest of the water passes by means of a pump 32 back through the heat exchanger 22 where it is heated by the scrubber liquid from the line 15, and passes through a line 33 to a water heater 34 where the temperature of the water is raised to the predetermined point before entry into the scrubber 13 through the line 14, and thus the water cycle is completed.

The superheater 17 may be heated by any known manner, such as by means of a high temperature fluid coming from a source of heat, through a line 35, and which subsequently may pass through a line 36 to the water heater 34, and thence return to the source of heat through a line 37.

A line 38 controlled by a valve 39 is provided in the line 16 to permit the removal of inert gases, such as ethane or propane, which might be present with the olefine, and which would otherwise accumulate in the system.

The scrubber 13 may be a spray scrubber, packed tower, bubble-cap columns, or other known type of device for obtaining intimate contact between gases and liquids.

It is to be understood that the process of this invention is operable only for the production of those aliphatic alcohols which are stable, and at least partially miscible with water at the high temperatures and pressures employed.

The foregoing description is given by way of illustration, and many modifications of the process may be made within the scope of the invention as defined by the appended claims.

We claim:

1. The process of replacing alcohol vapor in a gas under high pressure and at a temperature of at least about 175° C. with water vapor which comprises bringing said gas into intimate contact with preheated water at substantially the pressure and temperature of said gas.

2. The process of replacing ethanol vapor in a gas under high pressure and at a temperature of at least about 175° C. with water vapor which comprises bringing said gas into intimate contact with preheated water at substantially the pressure and temperature of said gas.

3. The process of replacing isopropanol vapor in a gas under high pressure and at a temperature of at least about 175° C. with water vapor which comprises bringing said gas into intimate contact with preheated water at substantially the pressure and temperature of said gas.

4. Process for selectively recovering alcohol from the gaseous products of the hydration of olefines under a pressure from about 500 to about 3000 pounds per square inch and at a temperature of about 175° to about 375° C. which comprises bringing said gaseous products into contact with liquid water under said high pressure and at substantially said high temperature, and thereafter separating the alcohol from the water.

5. Process for selectively recovering alcohol from the gaseous products of the hydration of ethylene under a pressure from about 500 to about 3000 pounds per square inch and at a temperature of about 175° to about 375° C. which comprises bringing said gaseous products into contact with liquid water under said high pressure and at substantially said high temperature, and thereafter separating the alcohol from the water.

6. Process for selectively recovering alcohol from the gaseous products of the hydration of propylene under a pressure from about 500 to about 3000 pounds per square inch and at a temperature of about 175° to about 375° C. which comprises bringing said gaseous products into contact with liquid water under said high pressure and at substantially said high temperature, and thereafter separating the alcohol from the water.

7. In the process of producing alcohols by the hydration of olefines, the step which comprises replacing the alcohol vapor in the effluent gases from the reaction zone with water vapor by bringing said effluent gases into intimate contact with preheated water at substantially the pressure and temperature of the said effluent gases leaving the reaction zone.

8. In the process of producing alcohol by the hydration of ethylene, the step which comprises replacing the alcohol vapor in the effluent gases from the reaction zone with water vapor by bringing said effluent gases into intimate contact with preheated water at substantially the pressure and temperature of the said effluent gases leaving the reaction zone.

9. In the process of producing alcohol by the hydration of propylene, the step which comprises replacing the alcohol vapor in the effluent gases from the reaction zone with water vapor by bringing said effluent gases into intimate contact with preheated water at substantially the pressure and temperature of the said effluent gases leaving the reaction zone.

10. In the cyclic process for producing alcohols by the hydration of olefines, the method of maintaining the cycle at a substantially uniform temperature level which comprises replacing the alcohol vapor in the effluent gases from the reaction zone with water vapor by bringing the gases into intimate contact with preheated water at substantially the pressure and temperature of said gases.

11. In the cyclic process for producing ethanol by the hydration of ethylene under high pressure and at high temperature, the method of maintaining the cycle at a substantially uniform temperature level which comprises replacing the ethanol vapor in the effluent gases from the reaction zone with water vapor by bringing the gases into intimate contact with preheated water at substantially the temperature and pressure of said gases.

12. In the cyclic process for producing isopropanol by the hydration of propylene under high pressure and at high temperature, the method of maintaining the cycle at a substantially uniform temperature level which comprises replacing the isopropanol vapor in the effluent gases from the reaction zone with water vapor by bringing the gases into intimate contact with preheated water at substantially the temperature and pressure of said gases.

13. The cyclic process for producing ethanol from an ethylene-containing gas at a pressure from about 500 to about 3000 pounds per square inch, and temperature of about 175° to about 375° C. which comprises adding fresh gas to a recycled gas containing ethanol vapor, passing the mixture countercurrently through a scrubbing system in intimate direct contact with liquid water at a similar high temperature whereby said mixture is depleted of contained ethanol vapor and becomes saturated with water vapor; passing it into intimate contact with an acid catalyst comprising at least one of the group consisting of sulfuric and phosphoric acids; passing the hot ethanol-containing gases in admixture with fresh ethylene-containing gas through said scrubbing system, and recycling the unreacted ethylene-containing gas.

14. The cyclic process for producing isopropanol from a propylene-containing gas at a pressure from about 500 to about 3000 pounds per square inch, and temperature of about 175° to about 375° C. which comprises adding fresh gas to a recycled gas containing isopropanol vapor, passing the mixture countercurrently through a scrubbing system in intimate direct contact with liquid water at a similar high temperature whereby said mixture is depleted of contained isopropanol vapor and becomes saturated with water vapor; passing it into intimate contact with an acid catalyst comprising at least one of the group consisting of sulfuric and phosphoric acids; passing the hot isopropanol-containing gases in admixture with fresh propylene-containing gas through said scrubbing system, and recycling the unreacted propylene-containing gas.

KENNETH H. ROWLAND.
ROLF V. WALLIN.